Nov. 17, 1953  A. L. GARDNER  2,659,839
SEQUENCE SPARK GAP SYSTEM
Filed July 17, 1951

INVENTOR.
ANDREW L. GARDNER
BY
Lippincott & Smith
ATTORNEYS

Patented Nov. 17, 1953

2,659,839

UNITED STATES PATENT OFFICE 2,659,839

SEQUENCE SPARK GAP SYSTEM

Andrew L. Gardner, Berkeley, Calif., assignor, by mesne assignments, to the United States of America Application July 17, 1951, Serial No. 237,257

11 Claims. (Cl. 315—150)

1

This invention relates to improvements in switching means for pulse-forming networks and, in particular, to a novel sequence spark gap switch.

Many features are desirable in switches of this character, but the essential features necessary to switches suitable for radar applications are extremely low jitter time and high pulse voltage and current characteristics. Prior art devices of the rotary spark gap type are capable of the high pulse voltage and current requirements but have the disadvantage of relatively high jitter time (50 microseconds) which requires utilization of self-synchronous timing systems.

Systems employing gas tubes of the diode, argon thyratron and hydrogen thyratron type are not capable of the high peak pulse current ratings necessary for high power radar pulsing. However, systems of this nature may be suitably employed as driver circuits for the sequence spark gap of the present invention.

A fixed spark gap which is fired by means of a saturable core trigger transformer whose secondary is in series with the spark gap is capable of long lived functioning with small jitter time over a wide range of operating voltages, but has disadvantages in the poor pulse shape produced and in the limitation of the relatively low peak pulse current which the transformer secondary winding can carry.

The present invention alleviates the foregoing and provides a switching circuit suitable for radar pulsing and many other applications. The circuit includes a multiunit voltage divider adapted for connection to a pulse-forming network. A gap is provided in parallel with each unit of the voltage divider, so that when a voltage is applied to the divider, each gap receives a substantially equal portion of the voltage. Each portion is preferably of an amount slightly less than the breakdown voltage required for the individual gaps. A number of capacitors, each having a capacity very much greater than the inherent capacities of the individual gaps, are connected between the intergap terminals and ground, or between these terminals and the low potential end of the voltage divider. The combination of the voltage divider and these capacitors resembles a multisection artificial line. Connections are further provided at the midpoint of the voltage divider for introducing a trigger potential or pulse thereto.

In operation, the pulse-forming network is connected to charge the number of capacitors, through the units of the voltage divider, each

2 to a different fraction of the pulse-forming network voltage. Since the gaps are each preferably connected across equal units of the voltage divider, the respective potentials across the gaps are the same even though the potentials of the gap terminals are different.

When a trigger potential or pulse is introduced at the midpoint of the voltage divider, a very substantial portion of this voltage is applied to the adjacent gaps, due to the fact that the capacitors connected between the gaps and ground or the gaps and the low side of the voltage divider potential supply form a voltage dividing network with the inherent capacities of the gaps. As is well known, a voltage applied to a circuit consisting of two or more capacitors will be divided across the capacitors in inverse relation to the individual capacities. Hence a very substantial portion of the trigger potential is applied to the gaps to cause breakdown.

As was mentioned, the gaps are alined in a series array. Preferably, the individual gaps are so disposed that ultraviolet illumination produced by the breakdown of one gap may be radiated into the next succesive gap to aid in the breakdown thereof. As soon as the gaps adjacent the midpoint of the voltage divider break down, a like portion of the trigger potential is applied to the next successive gaps to cause very rapid breakdown thereof. In this manner, all of the gaps in the circuit are broken down or fired in very rapid sequence. The pulse initiated by the simultaneous firing of these gaps may be applied to a load which is connected in series with the pulse-forming network and the sequence gap circuit. This load may be a high powered pulsed oscillator and/or amplifier for radar applications. By utilizing a high potential trigger source, and by taking advantage of the ultraviolet illumination available for successive gaps, substantially 100% voltage control over a wide range may be achieved with the present invention.

Accordingly, one of the objects of the present invention is the provision of a switching circuit for pulse-forming networks capable of having a minimum jitter time.

Another object of the present invention is the provision of a multiple fixed gap system capable of substantially 100% voltage control throughout a very large range of applied voltages.

It is a further object of the present invention to provide a sequence spark gap capable of extremely accurate switching of pulse-forming networks which requires relatively inexpensive components.

Still a further object of the present invention is the provision of a switching circuit capable of actuation by a relatively simple driver circuit.

A still further object of the present invention is the provision of a plurality of sequence spark gaps interconnected to switch a balanced line pulse-forming network.

Other and further objects will be apparent to those skilled in the art from a reading of a detailed description of a preferred embodiment of the present invention when taken in conjunction with the accompanying drawings which follows.

Figure 1:
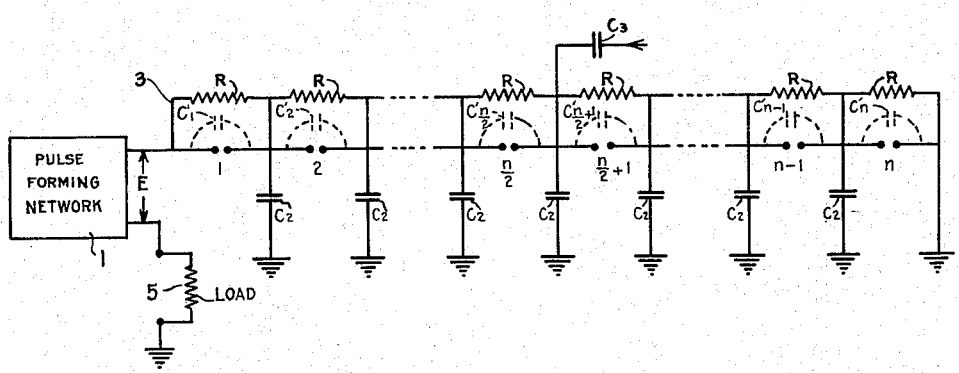
Fig. 1 represents a preferred circuit arrangement of the present invention connected to switch a pulse-forming network.

In Fig. 1, a pulse-forming network 1, capable of being charged to a value E, is connected to a series of spark gaps, N in number, represented at 1, 2 —N. A multiunit voltage divider 3, comprised of a series of equal impedance units, each designated by R, is connected from the high voltage terminal of the pulse-forming network to ground, so that each unit will be connected in parallel with an individual gap of the series. A number of condensers $C_2$ are connected between the intergap terminals and ground. The condensers $C_2$ each have a very high value of capacity relative to the individual inherent capacities $C'_1 - C'_n$. Connections including a condenser $C_3$ are provided at the electrical midpoint of the voltage divider 3 for introducing a trigger potential or pulse thereto. Further connections are provided for a load 5 in series with the pulse-forming network 1 and the sequence gap switch.

Various factors dictate the circuit parameters for any set of given conditions. Preferably, the time constant of the circuit which would be formed if all of the resistors R were connected in series with the condenser $C_3$ is much less than four times the charging time. If also that total capacity of the condensers $C_2$ is much less than the capacity of $C_3$, then it is possible for the condensers $C_2$ and the condenser $C_3$ to become charged along with the pulse-forming network 1. The latter of these two conditions also insures that the blocking condenser be of sufficient size to prevent serious trigger voltage loss across it during triggering.

While the pulse line is being charged to a potential of E volts, each of the condensers $C_2$ becomes charged to a different fraction of E through the biasing resistors R. This may be accomplished, provided the preceding conditions are met. Each gap, therefore, is biased so that it must stand off $$\frac{E}{n}$$

volts. If the first gap breaks down, then the second gap immediately receives an additional voltage of approximately $$\frac{C_2}{C'_2+C_2} \times \frac{E}{n}$$

or approximately $$\frac{E}{n}$$

volts, since $$\frac{C_2}{C'_2+C_2}$$

is substantially unity. Similarly, if gaps 1 and 2 both break down, gap 3 immediately receives an additional voltage of $$\frac{2E}{n}$$

By analogy from the foregoing, the voltage ratio on the $$\left(\frac{n}{2}+1\right)$$

the gap in the overstressed and in the normally charged conditions is approximately equal to $$\frac{n}{2}$$

The foregoing analysis may be extended to determine the effect of the applied trigger voltage, it being first realized that the magnitude of the trigger voltage is very substantially larger than the potential appearing across each gap. A desirable trigger source is one which is capable of charging all of the condensers $C_2$ to a voltage of the same order of magnitude as the voltage to be switched in less than a microsecond. Such a trigger source may comprise either a direct coupled or a transformer coupled thyratron circuit. Assuming that $C'_1 = C'_2 = C'_3 \ldots = C'_n$, then upon application of the trigger voltage through condenser $C_3$, a voltage of approximately $$\frac{C_2}{C'_1+C_2}$$

times the trigger voltage is subtracted from the adjacent gap on the ground side and added to the adjacent gap on the high voltage side of the point of trigger application. Thus the extra voltage breaks down the gap located on the high voltage side and adjacent the trigger connection. Then the next successive gap toward the high voltage end receives $$\frac{C_2}{C'_1+C_2}$$

times the trigger voltage plus $$\frac{E}{n}$$

volts, in addition to the $$\frac{E}{n}$$

volts already there. In this manner, all of the gaps on the high voltage end are fired in succession.

Since the trigger voltage is high in comparison with the potential across each gap, breakdown of the gaps toward the low voltage end will successively occur. Breakdown of the gap on the low voltage side and adjacent the point of trigger application is aided by the ultraviolet illumination which is produced when firing occurs in the gap on the high voltage side adjacent the point of trigger application. Obviously, the breakdown of each gap aids the succeeding gap in its breakdown by radiating ultraviolet illumination thereto, thus facilitating ionization of the succeeding gaps.

Figure 2:
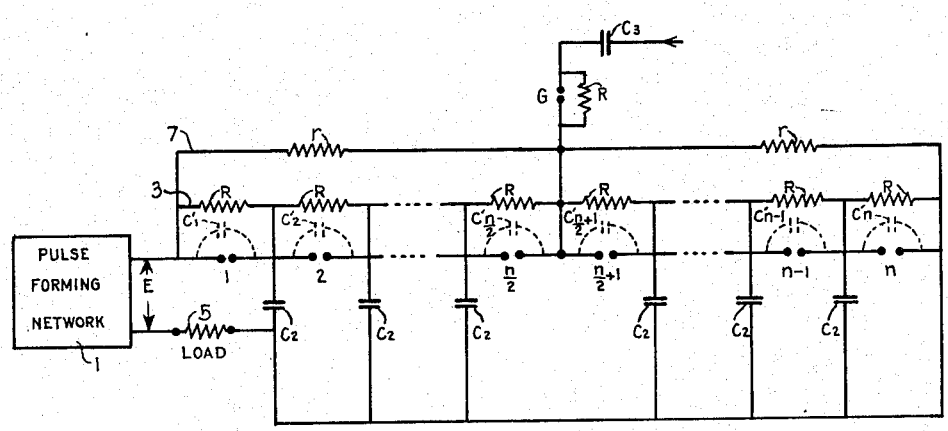
Fig. 2 represents a modification of the circuit of Fig. 1 also connected to switch a pulse-forming network.

The circuit of Fig. 2 represents a modified form of a sequence spark gap system. The condenser $C_2$, which was shown in Fig. 1 connected between the point of trigger application and ground, is eliminated. It should be mentioned that this condenser, if desired, may be omitted from the circuit of Fig. 1 also. Further, in Fig. 2 all of the condensers $C_2$ are connected to a low impedance line, which line may in turn be connected to either the high or the low voltage end of the voltage divider 3, but for purposes of illustration is shown connected to the low voltage end of divider 3. An additional voltage divider 7, including impedances $r$, is connected across voltage divider 3 to leave the connection between the resistors $r$ for application of a trigger potential. A gap G, preferably small relative to the other gaps in the circuit, is included in the trigger source connection with an impedance R connected in shunt therewith. In some cases, economy would result from tying half of the conrensers $C_2$ to ground and the other half to the hot side of the pulse line, in order to reduce the required voltage ratings of the condensers.

The gap G is provided to facilitate the firing of the gaps adjacent the points of trigger application. This is achieved by situating gap G so that radiation emitted when this gap is fired may penetrate the gaps $$\frac{n}{2} \text{ and } \frac{n}{2}+1$$

to start ionization in each of these gaps. The voltage divider 7 has been added to the circuit, in order to relieve the severity of the requirements of the circuit parameters. This enables the previous equation for $r$ to be replaced by the following: $r \times C_3$ must necessarily be much less than two times the pulse line charging time, and $4n \times R \times C_2$ must be much less than the pulse line charging time.

When desired, off center triggering may be employed in the circuit of Fig. 2. The values of resistors $r$ may remain equal and off center triggering will function adequately. Ideally, however, in a twenty-gap system, for example, if the trigger potential is applied between the ninth and tenth gaps, the ratio of resistors $r$ should be nine-to-eleven. Center pulsing is preferable, however, in all forms of the device, as it provides minimum break-down time and maximum consistency of operation.

With the circuit arrangement of Fig. 2, and when off-center triggering was employed, jitter time observations were made. In the voltage range below 5.5 kv., jitter time was approximately .05 microsecond or less, but in the range from about 5.5 kv. to 22 kv., jitter time was approximately .01 microsecond or less. It will be apparent that this particular range of jitter time compares most favorably to the jitter time of any of the switching systems heretofore known. The trigger potential broke down all of the gaps when the voltage E assumed any value from zero to a value which maintained each gap just slightly below breakdown potential, hence the sequence spark gap system of the present invention provides 100% voltage control throughout all values which the impressed voltage may assume. Of course, the sequence spark gap circuit may require electrical shielding and such protection against changes in humidity as are ordinarily deemed necessary. Also, preferably, a circulating medium is maintained about the sequence spark gap system, in order that the gases created by breakdown may be carried away.

Choice of suitable materials for the electrode sparking areas, backed up with copper to conduct the heat away or located so as to be air or water cooled, will aid in the elimination of electrode erosion. Alternatively, appropriate design of the electrode geometries will allow considerable erosion without undue changes in the gap lengths. In connection with this, it should be noted that the gap capacities must be maintained low. However, within limits, some alteration of electrode design may be tolerated. Further, use of replaceable spark gap assemblies of preferably the plug-in type will permit practically continuous use of the sequence spark gap system. A further feature of the present invention lies in the fact that the wide voltage control range of this type of gap system tends to counteract the control reducing effects of erosion.

Figure 3:
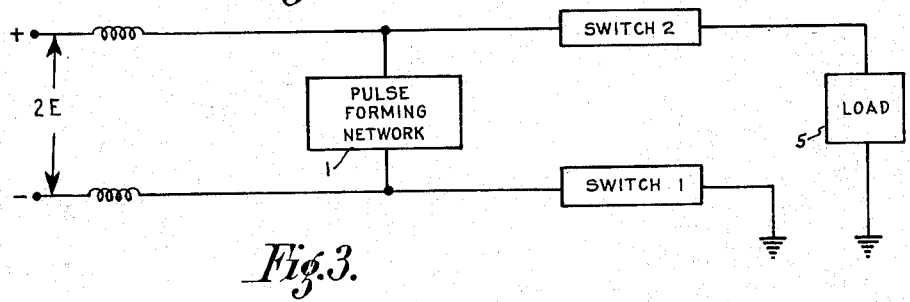
Fig. 3 is a representation in block diagram showing the application of two sequence spark gaps to a pulse-forming network of the balanced line type.

In Fig. 3, there is represented one of the applications for which the spark sequence gap switch is suited. In this circuit, a pulse line is charged with both positive and negative D. C. voltages of equal magnitudes. Switch 1 and switch 2, which may include a like or an unlike number of sequence spark gaps, are connected in series with the pulse-forming network 1 and the load 5, but in opposite lines from the network.

When switch 1 is fired, switch 2 receives a voltage increment equal to one-half the pulse line voltage or E volts. As switch 2 is a sequence spark gap switch, it will then fire by itself without a trigger pulse. The voltage control range of switch 2 of course depends upon the number of gaps that it contains as well as upon the other circuit constants which have been previously discussed.

It should again be emphasized that the very low jitter time and the substantially 100% voltage control range which is made possible by the present invention makes its use appear very promising for various high power applications which are far beyond the range of existing thyratrons, as well as the other prior art switching circuits hereinbefore mentioned.

What is claimed is:

1. A sequence spark gap comprising a multiunit voltage divider adapted for connection across a source of potential, a plurality of spark gaps respectively connected in parallel with the units of said divider, and a plurality of capacitors each of a magnitude substantially larger than that of the capacity of said individual gaps connected respectively between the units of said divider and a common connection to one terminal thereof.

2. A sequence spark gap comprising a plurality of gaps each defining a capacitor, a multiunit voltage divider connected to form respective parallel circuits between said gaps and the units thereof, a plurality of capacitors each having an amount of capacity substantially greater than that of the individual gaps and each connected to said voltage divider to form a shorted T section transmission line, said line being adapted for connection to a source of potential.

3. A sequence spark gap circuit of a type suitable for switching a pulse-forming network comprising a voltage divider having a plurality of taps along the length thereof, said divider adapted for connection to said network leaving one connection grounded, pairs of terminals connected to each consecutive pair of taps of said divider to define a plurality of gaps, said gaps each including an inherent capacity and a plurality of capacitors each having a magnitude substantially larger than the individual gap capacities and each connected between respective intergap junctions and ground.

4. A sequence spark gap circuit in accordance with claim 3 including a connection to the center tap along said divider adapted to convey a triggering pulse to said circuit for causing sequential gap firing.

5. A sequence spark gap circuit suitable for switching a pulse forming network comprising a substantially evenly tapped voltage divider, said divider adapted for connection at the ends thereof to said network, a pair of terminals connected to each consecutive pair of taps to define a plurality of gaps in parallel respectively with said pairs of taps, means connected to the midpoint of said voltage divider for supplying a triggering voltage to said circuit and a plurality of capacitors connected respectively to the interjunctions of said gaps to form a capacitive voltage divider with the capacity of said gaps and the relative magnitudes of said capacitors and said gap capacities being such as to cause a major portion of said trigger voltage to appear across said gap capacities.

6. A sequence spark gap circuit in accordance with claim 5 wherein said means includes a capacitor of a magnitude very substantially larger than said plurality of capacitors.

7. A sequence spark gap circuit in accordance with claim 5 including connections in series with said network and said circuit for a load whereby the voltage of said network is applied to said load when switching occurs.

8. A sequence spark gap circuit suitable for switching a pulse-forming network comprising a voltage divider having a plurality of substantially equal impedance units defined by a plurality of taps, said divider adapted for connection to said network to leave one connection grounded, a plurality of replaceable terminals disposed to define a gap across each of said units, means for introducing a trigger voltage to said circuit, a plurality of capacitors connected between said gaps and ground, each of said capacitors having a value substantially greater than the individual gap capacities, and load connections in series with said network and said circuit whereby the trigger voltage is proportional across individual gap capacities and associated capacitors in accordance with the respective reactances thereof to produce a sequential breakdown of each gap proceeding bilaterally from the point of application of said trigger voltage to result in a high voltage pulse being applied to said load connections.

9. A sequence spark gap system in accordance with claim 5 including a second voltage divider connected across said plurality of gaps and further connected to said trigger voltage supply means.

10. A sequence spark gap system in accordance with claim 5 wherein said means connected to said voltage divider includes a further gap connected in parallel to an impedance and the parallel combination being located sufficiently adjacent said plurality of gaps to supply radiation to at least one of said plurality of gaps.

11. A sequence spark gap circuit comprising a plurality of gaps each defining a capacity, a multiunit voltage divider connected to form respective parallel circuits between said gaps and the units thereof, a plurality of capacitors each having a capacity substantially greater than the individual gap capacities connected respectively between said gaps and a common return which connects to one end of said divider.

ANDREW L. GARDNER.

References Cited in the file of this patent

UNITED STATES PATENTS

| Number    | Name          | Date          |
|-----------|---------------|---------------|
| 2,099,327 | Brasch et al. | Nov. 16, 1937 |
| 2,119,588 | Lindenblad    | June 7, 1938  |
| 2,405,070 | Tonke et al.  | July 30, 1946 |